(12) United States Patent
Gammel et al.

(10) Patent No.: US 11,075,908 B2
(45) Date of Patent: Jul. 27, 2021

(54) AUTHENTICATION IN A SOFTWARE DEFINED NETWORK

(71) Applicant: Schweitzer Engineering Laboratories, Inc., Pullman, WA (US)

(72) Inventors: Dennis Gammel, Pullman, WA (US); James A. Lester, Stevensville, MT (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 216 days.

(21) Appl. No.: 16/414,928

(22) Filed: May 17, 2019

(65) Prior Publication Data

US 2020/0366672 A1 Nov. 19, 2020

(51) Int. Cl.
*H04L 29/06* (2006.01)

(52) U.S. Cl.
CPC .............................. *H04L 63/0876* (2013.01)

(58) Field of Classification Search
CPC .......................... H04L 63/0876; H04L 67/12
USPC ............................................................ 726/6
See application file for complete search history.

(56) References Cited

U.S. PATENT DOCUMENTS

| | | |
|---|---|---|
| 6,747,957 B1 | 6/2004 | Pithawala |
| 7,218,632 B1 | 5/2007 | Bechtolsheim |
| 7,376,831 B2 | 5/2008 | Kollmyer |
| 7,872,983 B2 | 1/2011 | Lai |
| 8,553,544 B2 | 10/2013 | Lai |
| 8,800,044 B2 | 8/2014 | Raad |
| 9,038,151 B1 | 5/2015 | Chua |
| 9,237,129 B2 | 1/2016 | Ling |
| 9,286,171 B2 | 3/2016 | Cardona |
| 9,432,255 B1 | 8/2016 | Hasan |
| 9,432,380 B2 | 8/2016 | Margalit |

(Continued)

FOREIGN PATENT DOCUMENTS

| | | |
|---|---|---|
| EP | 2765751 | 8/2014 |
| KR | 20150051107 | 5/2015 |
| WO | 2015038040 | 3/2015 |

OTHER PUBLICATIONS

Braun, Wolfgang, Menth, Michael, Software-Defined Networking Using OpenFlow: Protocols, Applications and Architectural Design Choices, Future Internet, May 12, 2014.

(Continued)

*Primary Examiner* — Tu T Nguyen
(74) *Attorney, Agent, or Firm* — Jared L. Cherry (57) ABSTRACT

The present disclosure pertains to systems and methods for improving security and simplifying authentication in a software defined network ("SDN"). In various embodiments, the systems and methods disclosed herein may be applied in operational technology networks, such as those used in electrical power systems. In one embodiment, a device to be authenticated may be in communication with a network device. The network device may receive authentication credentials from the device to be authenticated and may communicate the authentication credentials to an authenticator. The authenticator may assess and approve the authentication credentials and communicate approval of the authentication credentials to the network device. The network device may implement a plurality of communication flows associated with the device to be authenticated.

18 Claims, 4 Drawing Sheets

(56) References Cited

U.S. PATENT DOCUMENTS

| | | | |
|---|---|---|---|
| 9,680,588 B2 | 6/2017 | Connolly | |
| 9,686,125 B2 | 6/2017 | Smith | |
| 9,769,060 B2 | 9/2017 | Dearien | |
| 2002/0172157 A1 | 11/2002 | Rhodes | |
| 2003/0046587 A1* | 3/2003 | Bheemarasetti | H04L 63/0272 726/4 |
| 2003/0112821 A1 | 6/2003 | Cleveland | |
| 2003/0125924 A1 | 7/2003 | Lines | |
| 2003/0133443 A1 | 7/2003 | Klinker | |
| 2003/0188159 A1 | 10/2003 | Josset | |
| 2005/0025141 A1 | 2/2005 | Chao | |
| 2005/0078672 A1 | 4/2005 | Caliskan | |
| 2005/0192008 A1 | 9/2005 | Desai | |
| 2008/0005558 A1 | 1/2008 | Hadley | |
| 2008/0080384 A1 | 4/2008 | Atkins | |
| 2009/0257743 A1 | 10/2009 | Chung | |
| 2009/0285093 A1 | 11/2009 | Bolt | |
| 2009/0313189 A1 | 12/2009 | Sun | |
| 2010/0241608 A1 | 9/2010 | Huang | |
| 2011/0085567 A1 | 4/2011 | Beecroft | |
| 2011/0087952 A1 | 4/2011 | Marin | |
| 2013/0077477 A1 | 3/2013 | Daraiseh | |
| 2013/0108259 A1 | 5/2013 | Srinivas | |
| 2013/0159865 A1 | 6/2013 | Smith | |
| 2013/0212285 A1 | 8/2013 | Hoffmann | |
| 2013/0250770 A1 | 9/2013 | Zou | |
| 2013/0263247 A1 | 10/2013 | Jungck | |
| 2013/0294228 A1 | 11/2013 | Ahuja | |
| 2014/0025945 A1 | 1/2014 | McGrew | |
| 2014/0029451 A1 | 1/2014 | Nguyen | |
| 2014/0064100 A1 | 3/2014 | Edwards et al. | |
| 2014/0112130 A1 | 4/2014 | Yang et al. | |
| 2014/0115706 A1 | 4/2014 | Silva et al. | |
| 2014/0129700 A1 | 5/2014 | Mehta | |
| 2014/0153572 A1 | 6/2014 | Hampel | |
| 2014/0160939 A1 | 6/2014 | Arad | |
| 2014/0226467 A1 | 8/2014 | Park | |
| 2014/0241345 A1 | 8/2014 | DeCusatis | |
| 2014/0245387 A1 | 8/2014 | Colpo | |
| 2014/0280834 A1 | 9/2014 | Medved | |
| 2014/0325038 A1 | 10/2014 | Kis | |
| 2014/0325649 A1 | 10/2014 | Zhang | |
| 2014/0371941 A1 | 12/2014 | Keller et al. | |
| 2014/0376406 A1 | 12/2014 | Kim | |
| 2015/0081762 A1 | 3/2015 | Mason et al. | |
| 2015/0112933 A1 | 4/2015 | Satapathy | |
| 2015/0195190 A1 | 7/2015 | Shah Heydari | |
| 2015/0312658 A1 | 10/2015 | Winzer | |
| 2015/0363522 A1 | 12/2015 | Maurya | |
| 2016/0043996 A1 | 2/2016 | Syed Mohamed | |
| 2016/0119299 A1 | 4/2016 | Amulothu | |
| 2016/0142427 A1 | 5/2016 | de los Reys | |
| 2016/0165454 A1 | 6/2016 | Li | |
| 2016/0330076 A1 | 11/2016 | Tiwari | |
| 2016/0337247 A1 | 11/2016 | Yao | |
| 2016/0344592 A1 | 11/2016 | Cook | |
| 2016/0352731 A1* | 12/2016 | Mentze | H04L 63/0876 |
| 2017/0026225 A1 | 1/2017 | Smith | |
| 2017/0026226 A1 | 1/2017 | Grussling | |
| 2017/0026243 A1 | 1/2017 | Berner | |
| 2017/0026252 A1 | 1/2017 | Dearien | |
| 2017/0026276 A1 | 1/2017 | Dearien | |
| 2017/0026291 A1 | 1/2017 | Smith | |
| 2017/0026292 A1 | 1/2017 | Smith | |
| 2017/0026349 A1 | 1/2017 | Smith | |

OTHER PUBLICATIONS

Cahn, Adam, Hoyos, Juan, Hulse, Matthew, Keller, Eric, Software-Defined Energy Communication Networks: From Substation Automation to Future Smart Grids, Smart Grid Communications, IEEE Oct. 2013.

Dally, William J., Virtual-Channel Flow Control, IEEE Transactions on Parallel and Distributed Systems, vol. 3, No. 2, Mar. 1992.

Jain, Sushant, et al., B4: Experience with a Globally-Deployed Software Defined WAN, ACM SIGCOMM Computer Communication Review, vol. 43 Issue 4, pp. 3-14. Oct. 2013.

Monaco, Matthew, Michel, Oliver, Keller, Eric, Applying Operating System Principles to SDN Controller Design, Hotnets '13, Nov. 2013.

Drutskoy, Dmitry, Keller, Eric, Rexford, Jennifer, Scalable Network Virtualization in Software-Defined Networks, IEEE Internet Computing, vol. 17, Issue: 2, Nov. 27, 2012.

Kuzniar, Maciej, et al., Automatic Failure Recovery for Software-Defined Networks, HotSDN '13, Aug. 16, 2013.

Mizrahi, Tal, Moses, Yoram. ReversePTP: A Software Defined Networking Approach to Clock Synchronization, HotSDN '14, Aug. 22, 2014.

Ramos, Ramon Marques, et al. SlickFlow: Resilient Source Routing in Data Centere Networks Unlocked by OpenFlow, 2013 IEEE 38th Conference on Local Computer Networks, Oct. 2013.

Torhonen, Ville, Designing a Software-Defined Datacenter, Master of Science Thesis, Tampere University of Technology, May 2014.

Yang, Qiaoyin and Smith, Rhett, Improve Protection Communications Network Reliability Through Software-Defined Process Bus, Jan. 2018.

Dearien, Jason: "Setting Up a Fully Redundant RSTP-to-SDN Tie Point" Application Guide, vol. II AG2017-28, Sep. 22, 2017.

* cited by examiner

AUTHENTICATION IN A SOFTWARE DEFINED NETWORK

TECHNICAL FIELD

The present disclosure pertains to systems and methods for improving security and simplifying authentication in a software defined network ("SDN"). More specifically, but not exclusively, various embodiments consistent with the present disclosure may be applied in operational technology ("OT") networks.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Operational technology (OT) may be integral to operation of other systems, such as electric power systems, telecommunication systems, manufacturing systems, alarm systems, and a variety of other applications. OT networks may manage, monitor, and control a wide range of devices. OT networks may comprise a large number of machine-to-machine communications, and as such, large volumes of data may be generated and transmitted. Management of such networks may present a variety of challenges.

OT networks may utilize a variety of technologies, including software defined network ("SDN") networking technologies. In an SDN, a controller may regulate communications on the network. SDN networking technologies offer a variety of advantages that are advantageous in OT networks (e.g., deny-by-default security, latency guarantees, deterministic transport capabilities, redundancy and failover planning, etc.). An SDN allows a programmatic change control platform, which allows an entire communication network to be managed as a single asset, simplifies the understanding of the network, and enables continuous monitoring of a network. In an SDN, the systems that decide where the traffic is sent (i.e., the control plane) are separated from the systems that perform the forwarding of the traffic in the network (i.e., the data plane).

The control plane may be used to achieve the optimal usage of network resources by creating specific data flows through the communication network. A data flow, as the term is used herein, refers to a set of parameters used to match and take action based on network packet contents. Data flows may permit dedicated paths based on a variety of criteria that offer significant control and precision to operators of the network. In contrast, in large traditional networks, trying to match a network discovered path with an application desired data path may be a challenging task involving changing configurations in many devices. To compound this problem, the management interfaces and feature sets used on many devices are not standardized. Still further, network administrators often need to reconfigure the network to avoid loops, gain route convergence speed, and prioritize a certain class of applications.

Significant complexity in managing a traditional network in the context of an electric power transmission and distribution system arises from the fact that each network device (e.g., a switch or router) has control logic and data forwarding logic integrated together. For example, in a traditional network router, routing protocols such as Routing Information Protocol (RIP) or Open Shortest Path First (OSPF) constitute the control logic that determines how a packet should be forwarded. The paths determined by the routing protocol are encoded in routing tables, which are then used to forward packets. Similarly, in a Layer 2 device such as a network bridge (or network switch), configuration parameters and/or a Spanning Tree Algorithm (STA) constitute the control logic that determines the path of the packets. Thus, the control plane in a traditional network is distributed in the switching fabric (network devices), and as a consequence, changing the forwarding behavior of a network involves changing configurations of many (potentially all) network devices.

In an SDN, a controller embodies the control plane and determines how packets (or frames) should flow (or be forwarded) in the network. The controller communicates this information to the network devices, which constitute the data plane, by setting their forwarding tables. This enables centralized configuration and management of a network. As such, the data plane in an SDN consists of relatively simple packet forwarding devices with a communications interface to the controller to receive forwarding information. In addition to simplifying management of a network, an SDN architecture may also enable monitoring and troubleshooting features that may be beneficial for use in an electric power distribution system, including but not limited to: mirroring a data selected flow rather than mirroring a whole port; alarming on bandwidth when it gets close to saturation; providing metrics (e.g., counters and meters for quality of service, packet counts, errors, drops, or overruns, etc.) for a specified flow; permitting monitoring of specified applications rather than monitoring based on virtual local area networks (VLAN) or media access control (MAC) addresses.

Security is an increasingly significant concern in connection with critical infrastructure, such as electric power distribution and transmission systems. Electric power systems have increasingly become targets of cyberattacks. Due to the fact that electric power distribution and transmission systems may cover large areas, it may be necessary to transmit data over long distances. Such data should be protected from interception (e.g., using physical security and data security), however, concerns about security must be balanced against the functional requirements of the electric power transmission and distribution system. If the security requirements interfere with the performance of the system (e.g., by introducing too much latency), the data may not be useful. Where time-sensitive data is transmitted over long distances (e.g., monitoring terminals of a long electric transmission line), the competing concerns of security and functionality may be in tension.

Deny-by-default security may present challenges during start up because authentication information needs to be transmitted before the SDN can operate normally. One potential solution may be to disable deny-by-default security during a start up state; however, this solution may introduce security risks. Another solution may involve introducing a plurality of authenticators through the network; however, this solution may introduce additional complexity by increasing the number of devices that must be updated with authentication information (e.g., key management, device revocation, etc.) and/or updated with more frequent security patches.

In various embodiment consistent with the present disclosure, connection devices in an SDN may start up in a state that transmits authentication information to an authentication device. The start up state may retain the benefits of deny-by-default security, with the exception of communicating authentication information to an authentication device. By transmitting authentication requests to a centralized authentication device, fewer devices must be updated with authentication information.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

Figure 1:
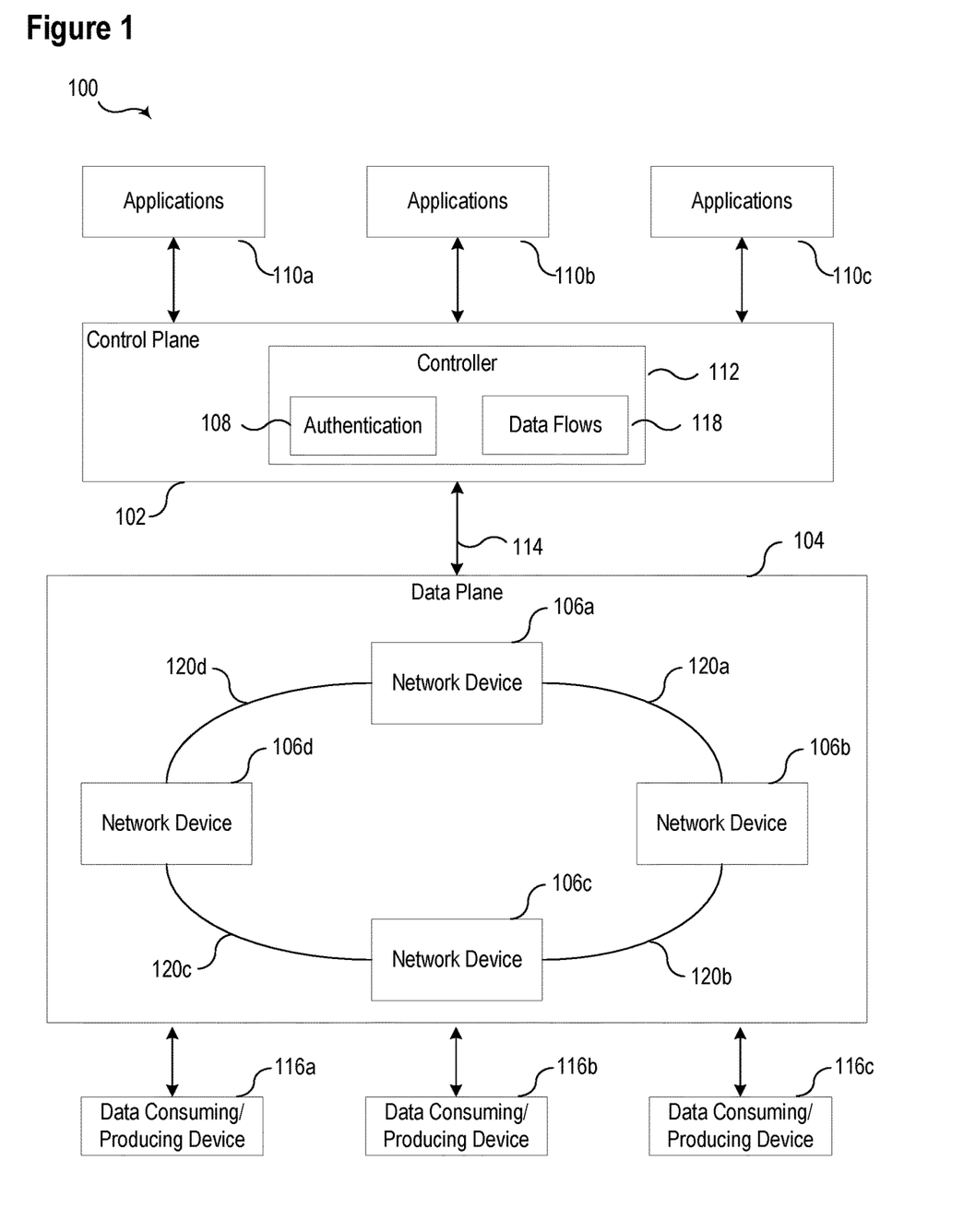
FIG. 1 illustrates a conceptual representation of an SDN system including a control plane, a data plane, and a plurality of data consumers/producer devices consistent with embodiments of the present disclosure.

FIG. 1 illustrates a conceptual representation of an SDN system 100 including a control plane 102, a data plane 104, and a plurality of data consumer/producer devices 110a-110c consistent with embodiments of the present disclosure. The control plane 102 directs the flow of data through the data plane 104. More specifically, a controller 112 may communicate with the plurality of network devices 106a-106f via an interface 114 to establish data flows. The controller may specify rules for routing traffic through the data plane 104 based on a variety of criteria.

As illustrated, the data plane 104 includes a plurality of network devices 106a-106d in communication with one another via a plurality of physical links 120a-120d. In various embodiments, the network devices 106a-106d may be embodied as switches, multiplexers, and other types of network devices. The physical links 120a-120d may be embodied as Ethernet, fiber optic, and other forms of data communication channels. As illustrated, the physical links 120a-120d between the network devices 106a-106d may provide redundant connections such that a failure of one of the physical links 120a-120d is incapable of completely blocking communication with an affected network device. In some embodiments, the physical links 120a-120d may provide an N−1 redundancy or better.

The data consuming/producing devices 116a-116c may represent a variety of devices within an electric power transmission and distribution system that produce or consume data. For example, data consuming/producing devices may, for example, be embodied as a pair of transmission line relays configured to monitor an electrical transmission line. The transmission line relays may monitor various aspects of the electric power flowing through the transmission line (e.g., voltage measurements, current measurements, phase measurements, synchrophasers, etc.) and may communicate the measurements to implement a protection strategy for the transmission line. Traffic between the transmission line relays may be routed through the data plane 104 using a plurality of data flows implemented by controller 112. Of course, data consuming/producing devices 116a-116c may be embodied by a wide range of devices consistent with embodiments of the present disclosure.

Applications 110a-110c may represent a variety of applications operating in an applications plane. In the SDN architecture illustrated in FIG. 1, controller 112 may expose an application programming interface (API) that services 110a-110c can use to configure the data plane 104. In this scenario, controller 112 may act as an interface to the data plane 104 while the control logic resides in the applications 110*a*-110*c*. The configuration of controller 112 and applications 110*a*-110*c* may be tailored to meet a wide variety of specific needs.

In the illustrated embodiment, each data consuming/producing device 116*a*-116*c* may be authenticated before information is transmitted by data plane 104. Upon initialization, the data consuming/producing devices 116*a*-116*c* may transmit information to one of more SDN switches 106*a*-106*d*. The SDN switches 106*a*-106*d* may communicate the authentication information to the controller 112. The controller 112 may include an authentication subsystem 108 that may assess the authentication information provided by the data consuming/producing devices 116*a*-116*c*. Upon successful authentication, a data flows subsystem 118 may enable one or more data flows associated with each data consuming/producing device 116*a*-116*c*.

Various embodiments may utilize a variety of authentication techniques and protocols. Various embodiments may utilize the 802.1X or 802.1AE protocol for authentication. Certain terminology used in connection with the 802.1X or 802.1AE protocol may be used herein; however, the present disclosure is not limited to the 802.1X or 802.1AE protocol. In other embodiments, a MAC address may be assessed in an authentication process. For example, if a supplicant does not support a more sophisticated authentication scheme, the MAC address of a device may be used to authenticate a device in some embodiments. Further, in some embodiments, MAC address, IP address, or other identifier may be used to join a supplicant to a VLAN that may allow communication with some network components, such as the authentication subsystem 108. Such embodiments may be limited to specific ports that are configured to support MAC address bypass.

In some embodiments, the communication flows may be stored in the SDN switches 106*a*-106*d*, such that the communication flows do not need to be programmed by the controller 112 after each authentication. Rather, the communication flows associated with a particular data consuming/producing device 116*a*-116*c* may be disabled until the device is successfully authenticated and may be enabled after authentication. In various embodiments, the SDN switches 106*a*-106*d* may comprise a non-volatile computer readable storage medium to store a plurality of communication flows.

Figure 2:
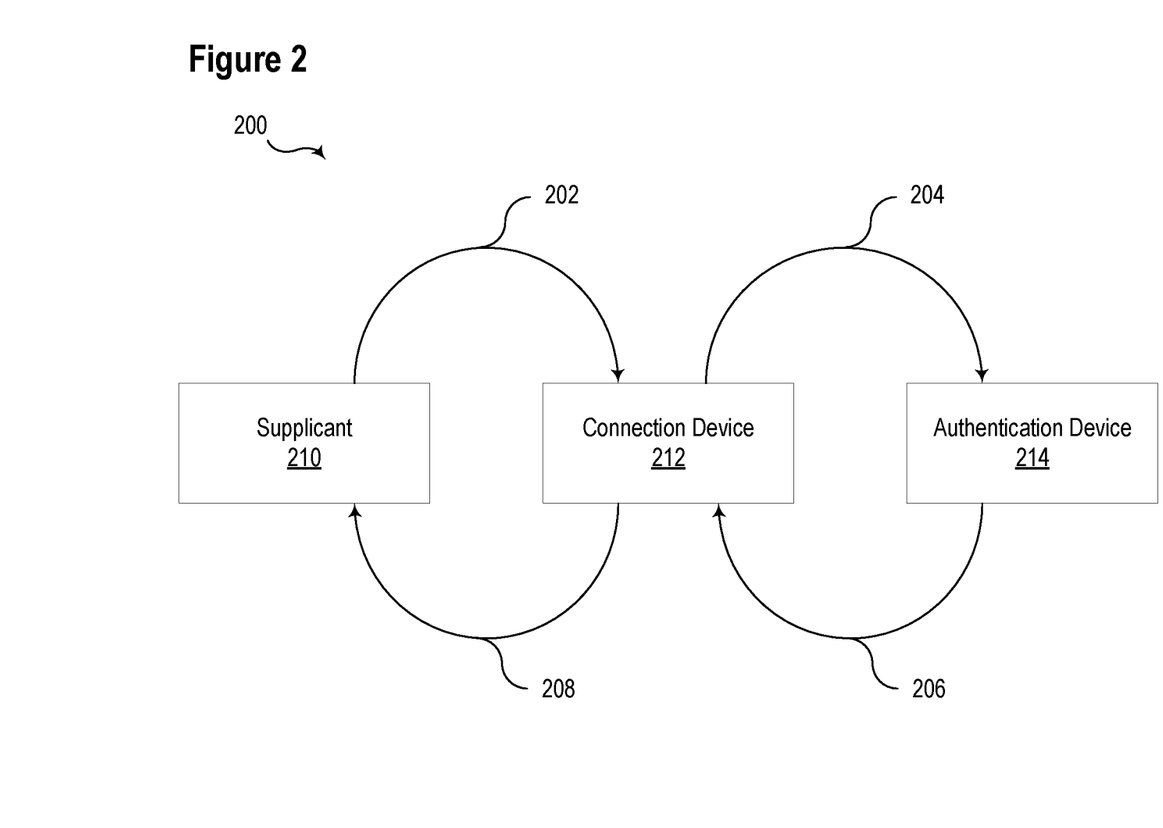
FIG. 2 illustrates a conceptual diagram of a system for transmitting authentication information from a supplicant to an authentication device though a connection device consistent with embodiments of the present disclosure.

FIG. 2 illustrates a conceptual diagram of a system 200 for transmitting authentication information from a supplicant 210 to an authentication device 214 though a connection device 212 consistent with embodiments of the present disclosure. At start up, a supplicant 210 may send authentication information 202 using an Extensible Authentication Protocol (EAP) or EAP over LAN (EAPOL) message. The supplicant 210 may comprise a data producing or data consuming device in an OT network. The authentication information 202 may be transmitted to a connection device 212. In various embodiments, the connection device 212 may be embodied as an SDN switch in a SDN data plane.

The connection device 212 may communicate 204 the authentication information 202 from the supplicant 210 to an authentication device 214. The authentication device 214 may assess the authentication information and determine whether the supplicant 210 should be allowed access to the network. In various embodiments, the authentication device 214 may be incorporated into an SDN controller. In other embodiments, the authentication device 214 may comprise a RADIUS server or other authentication server.

The determination of the authentication device 214 may be communicated 206 to connection device 212, which in turn may be communicated 208 to the supplicant 210. The communications 206 and 208 from the authentication device 214 may comprise both an EAP or EAPOL success message and communication flows to be implemented by supplicant 210 and/or connection device 212. Successful authentication and receipt of communication flows may transition supplicant 210 and/or connection device 212 to an operating state in which communications are routed in an SDN.

Figure 3:
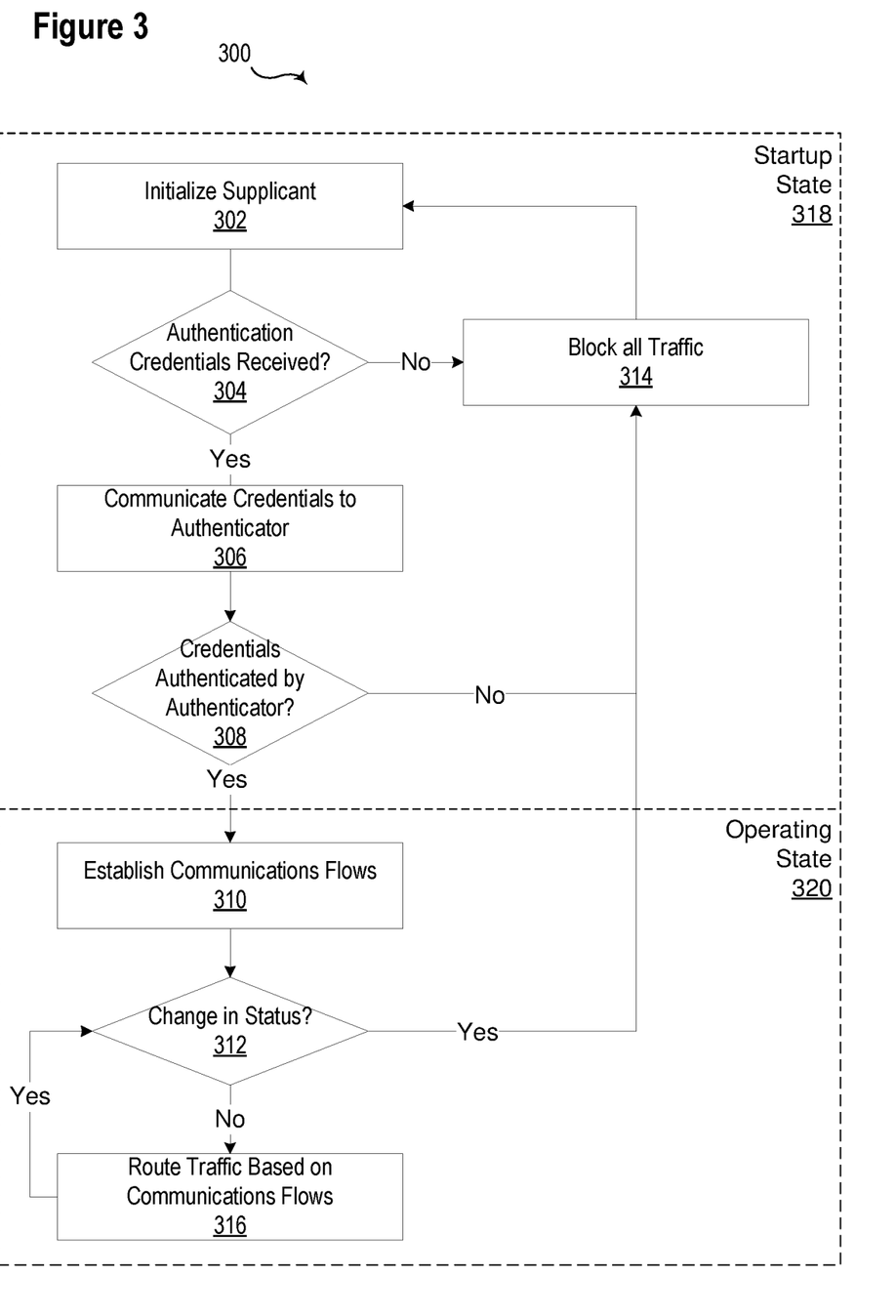
FIG. 3 illustrates a flow chart of a method that may be implemented by a system to authenticate a device in a SDN consistent with embodiments of the present disclosure.

FIG. 3 illustrates a flow chart of a method 300 that may be implemented by a system to authenticate a device in a SDN consistent with embodiments of the present disclosure. A supplicant may be initialized 302 in a start up state 318. In some embodiments, the supplicant may be embodied as a data producing or data consuming device in an OT network. In other embodiments, the supplicant may be embodied as any device connecting to a data network.

At 304, method 300 may determine whether the supplicant has provided authentication credentials. In some embodiments, the authentication credentials may be embodied using the EAP or an EAPOL format. The authentication credentials may be identified and separately processed by a connection device. Method 300 may block all traffic other than authentication credentials at 314, thus implementing deny-by-default security.

The credentials from the supplicant may be communicated to an authenticator at 306. In some embodiments, the authenticator may be associated with an SDN controller. In other embodiments, the authenticator may be embodied as a device separate from the SDN controller, such as a RADIUS server or other authentication server. At 308, the method 300 may determine whether the credentials have been authenticated by the authenticator. If the credentials are not authenticated (i.e., the authentication fails), method 300 may continue to be blocked at 314.

If authentication is successful at 308, method 300 may progress to an operating state 320. In the operating state 320, method 300 may establish communication flows at 310. The communication flows established at 310 may enable traffic meeting specified criteria to be routed based on the communication flows to or from the supplicant through an SDN. Traffic may be routed through the SDN based on the communication flows at 316.

Method 300 may remain in the operating state 320 until a change in status occurs at 312. A change in status may comprise a number of events, such as a loss of connectivity, a failed communication link, disassociation of the supplicant, and the like. Upon detection of a change in status, all traffic may be blocked at 314 and the system 300 may return to the start up state 318. In one embodiment, when a port transitions from an "up" state to a "down" state, the SDN controller may disable all the flows for that port and require authentication before re-enabling flows through the port. In other embodiments, individual ports may be configured using a fail-open setting. If a port is designated fail-open, the port may allow traffic following a failure. Such a setting may allow for rapid restoration of communication following a failure, and as such, may be advantageous in certain applications.

A fail-open setting may also be employed in the event that an authentication device is offline. If the authentication device is offline, a designer of a system consistent with the present disclosure may specify whether the system should block all traffic until the authentication device becomes available, whether the system should pass all traffic until the authentication device becomes available, or whether the system should utilize some other approach (e.g., a whitelist communications based on MAC or IP addresses). As one of skill in the art will appreciate, an appropriate strategy may depend on the particular application of a given system.

Figure 4:
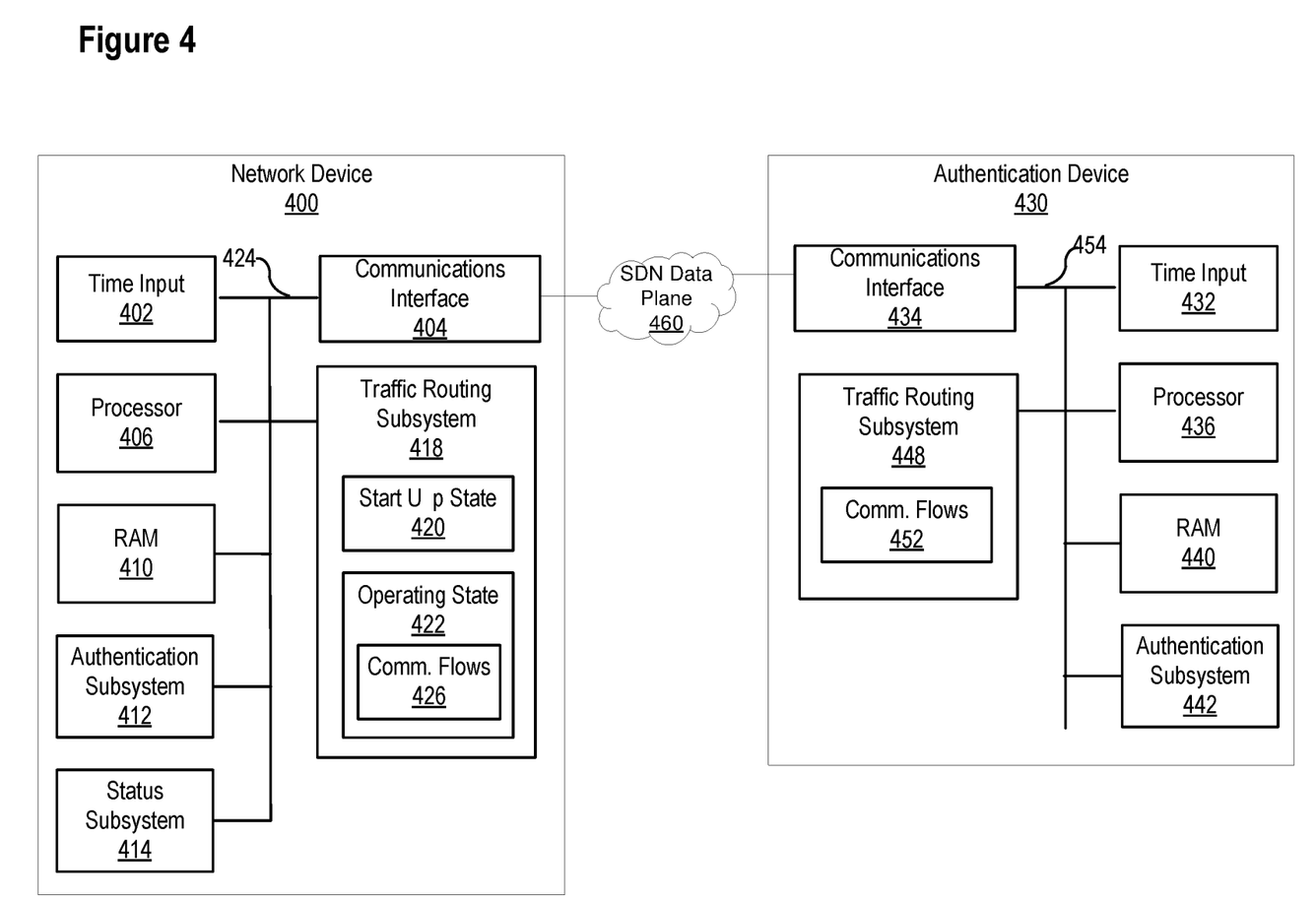
FIG. 4 illustrates a functional block diagram of a system comprising a network device to transmit authentication information between a supplicant and a controller in a software defined network consistent with embodiments of the present disclosure.

FIG. 4 illustrates a functional block diagram of a system comprising a network device 400 to transmit authentication information between a supplicant and an authentication device 430 in a software defined network consistent with embodiments of the present disclosure. In some embodiments, network device 400 and authentication device 430 may be implemented using hardware, software, firmware, and/or any combination thereof. Moreover, certain components or functions described herein may be associated with other devices or performed by other devices. The specifically illustrated configuration is merely representative of one embodiment consistent with the present disclosure.

In various embodiments, the network device 400 may be embodied as an SDN switch and the authentication device 430 may comprise a SDN controller. In the illustrated embodiment, the authentication device 430 may also act as the SDN controller, but in other embodiments, the authentication device 430 may be separate from the SDN controller.

Network device 400 and authentication device 430 include communications interfaces 404 and 434. The communication interfaces 404 and 434 may be in communication with other devices (not shown) via SDN data plane 460. In various embodiments, communication interfaces 404 and 434 may be embodied as Ethernet ports, fiber optic ports, SONET ports, and a variety of other technologies Network device 400 and authentication device 430 may further include a time input 402 and 432, which may be used to receive a time signal (e.g., a common time reference) allowing network device 400 and authentication device 430 to apply a time-stamp to received data. In certain embodiments, a common time reference may be received via communications interfaces 404 and 434, and accordingly, a separate time input may not be required. One such embodiment may employ the IEEE 1588 protocol. Data buses 424 and 454 may facilitate communication among various components of network device 400 and authentication device 430, respectively.

Processors 406 and 436 may be configured to process communications received via the communications interfaces 404 and 434 and time inputs 402 and 432. Further processors 406 and 436 may coordinate the operation of the other components of network device 400 and authentication device 430. Processors 406 and 436 may operate using any number of processing rates and architectures. Processors 406 and 436 may be configured to perform any of the various algorithms and calculations described herein. Processors 406 and 436 may be embodied as a general-purpose integrated circuit, an application-specific integrated circuit, a field-programmable gate array, and/or any other suitable programmable logic device. Instructions to be executed by processors 406 and 436 may be stored in random access memory (RAM) 410 and 440, respectively.

A status subsystem may monitor the status of network device 400 and detect changes. Changes may include events such as connection of a physical link, disconnection of a physical link, a change in the state of a connected device, and the like.

An authentication subsystem 412 of the network device 400 may identify and communicate authentication information received from a supplicant. In various embodiments, the authentication subsystem 412 may receive an authentication message (e.g., an EAP or EAPOL message) from a supplicant and communicate the authentication message to the authentication device 430.

An authentication subsystem 442 of the authentication device 430 may be configured to receive and process authentication requests from a plurality of devices. In various embodiments, the authentication subsystem may receive and process authentication requests that conform to the 802.1X or 802.1AE standard.

A traffic routing subsystem 418 of the network device 400 may process the data communications received via communications interface 404 and appropriately route such communications based on applicable data flows. The operation of traffic routing subsystem 418 may depend on whether the system is operating in the start up state 420 or an operating state 422. In the start up state 420, the traffic routing system 418 may transmit communications relating to authentication while blocking other traffic.

In some embodiments, the communication flows 426 may be stored by network device 400 and selectively enabled and disabled based on the authentication status of one or more supplicants. For example, the communication flows associated with an authenticated supplicant may be enabled, while the communication flows associated with an unauthenticated supplicant may be disabled. The communication flows 426 may be updated or changed by an SDN controller.

A traffic routing subsystem 448 of the authentication device 430 may be used to generate communication flows 452 implemented by the SDN data plane 460. Different communication flows may be implemented based on whether a device has been authenticated by authentication subsystem 442.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system to authenticate a device in a software defined network (SDN), the system comprising:
    a device to be authenticated;
    a network device, comprising:
        a first communication interface in communication with the device to be authenticated;
        a first authentication system to receive and transmit authentication credentials from the device to be authenticated;
    an authentication device, comprising:
        a second communication interface in communication with the network device to receive the authentication credentials;
        a second authentication system to:
            assess the authentication credentials;
            generate an approval of the authentication credentials; and
            communicate an approval of the authentication credentials to the network device via the second communication interface; and
        a traffic routing subsystem to implement a plurality of communication flows associated with the device to be authenticated based on the approval of the authentication credentials;

wherein the network device implements the plurality of communication flows associated with the device to be authenticated upon receipt of the approval of the authentication credentials, and wherein the network device operates in a start up state prior to receipt of the approval of the authentication credentials and in the start up state blocks all traffic from the device to be authenticated except the authentication credentials.

2. The system of claim 1, wherein the network device transitions to an operating state after receipt of the approval of the authentication credentials, and the network device routes traffic according to the plurality of communication flows in the operating state.

3. The system of claim 2, wherein the authentication credentials are provided according to one of the 802.1X and 802.1AE protocol.

4. The system of claim 1, wherein the first authentication system monitors traffic from the device to be authenticated and identifies authentication credentials to transmit to the authentication device.

5. The system of claim 1, further comprising a status subsystem to detect a change in status;

wherein the network device reverts to the start up state based on the change in status.

6. The system of claim 1, wherein the network device comprises an option to select a fail over option when the authentication device is unavailable.

7. The system of claim 1, wherein the network device comprises a non-volatile computer readable storage medium and implementation of the plurality of communication flows comprises activating the plurality of communication flows stored on the non-volatile computer readable storage medium.

8. The system of claim 1, wherein the network device comprises an option to selectively implement a media access control (MAC) authentication bypass based on a MAC address of the device to be authenticated.

9. The system of claim 1, wherein the SDN comprises an operational technology network.

10. A method for authenticating a device in a software defined network (SDN), the method comprising:

providing a device to be authenticated;

providing a network device in communication with the device to be authenticated;

receiving, using the network device, authentication credentials from a device to be authenticated in communication with the network device; and communicating, using the network device, authentication credentials from the device to be authenticated to an authenticator;

assessing, using an authenticator, the authentication credentials;

approving, using the authenticator, the authentication credentials;

communicating, using the authenticator, approval of the authentication credentials to the network device; and implementing a plurality of communication flows associated with the device to be authenticated based on the approval of the authentication credentials, and operating the network device in a start up state prior to receiving approval of the authentication credentials;

blocking, using the network device, all traffic from the device except the authentication credentials until the approval of the authentication of the device is received.

11. The method of claim 10, further comprising:

transitioning the network device to an operating state after receipt of the approval of the authentication credentials by routing traffic based on the plurality of communication flows.

12. The method of claim 10, further comprising:

monitoring traffic from the device to be authenticated and identifying authentication credentials to transmit to the authentication device.

13. The method of claim 12, wherein the authentication credentials are provided according to one of the 802.1X and the 802.1AE protocol.

14. The method of claim 10, further comprising:

detecting a change in status; and reverting the network device to the start up state.

15. The method of claim 10, further comprising providing an option to select a fail over option when the authentication device is unavailable.

16. The method of claim 10, further comprising:

storing the plurality of communication flows using a non-volatile computer readable storage medium associated with the network device; and wherein implementing the plurality of communication flows comprises activating the plurality of communication flows stored on the non-volatile computer readable storage medium.

17. The method of claim 10, further comprising providing an option to selectively implement a media access control (MAC) authentication bypass based on a MAC address of the device to be authenticated.

18. The method of claim 10, wherein the SDN comprises an operational technology network.

* * * * *